Dec. 2, 1947.  S. D. RUSSELL  2,431,892
LOADER CHUTE FOR PICKUP BALERS
Filed July 10, 1944

Inventor.
Stanley D. Russell
By Thiess, Olsen & Mecklenburger
Attys.

Patented Dec. 2, 1947

2,431,892

UNITED STATES PATENT OFFICE 2,431,892

LOADER CHUTE FOR PICKUP BALERS

Stanley D. Russell, Racine, Wis., assignor to J. I. Case Company, Racine, Wis., a corporation of Wisconsin Application July 10, 1944, Serial No. 544,183

3 Claims. (Cl. 100—19)

My invention relates to loader chutes for pickup balers.

One of the objects of my invention is to provide improved means for facilitating the handling and storage of bales after delivery from a pickup baler.

A further object is to provide such a construction in which the bales as they are delivered from the bale ejection chute are received by a loader chute which will direct the bales into position to be deposited on a vehicle having a trailer connection with the baler.

A further object of my invention is to provide such a construction which can be readily attached to existing types of pickup balers.

A further object is to provide such a construction to which the ordinary trailer vehicles now in use may be attached.

A further object of my invention is to provide such a construction which will not require additional power for pushing the bales through the loader chute.

A further object is to provide such a construction which will not cause skidding in turning a sharp corner.

A further object is to provide such a construction which will speed up the storage of the cured hay.

Further objects and advantages of the invention will be apparent from the description and claims.

In the drawings, in which an embodiment of my invention is shown,

Figure 1:
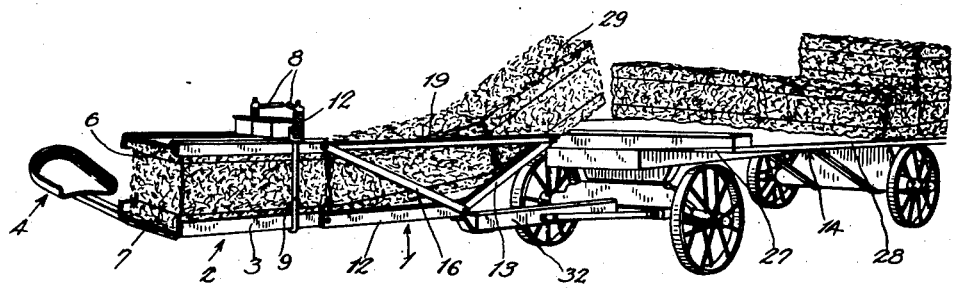
Figure 1 is a perspective view showing the rear end of a pickup baler with my improved loading chute attached thereto and with a trailer attached to the loading chute.

The loader chute 1 is designed to be attached to any usual or suitable type of pickup baler 2, although it may be desirable under certain conditions to make the loader chute a permanent part of the baler. As no novelty is claimed as to the pickup baler per se and as this is a well known type of baler, it is only necessary to state it comprises a baling chute 3 which extends longitudinally of the direction of travel of the baler and that the baler picks up the cured hay from the swath or windrow and packs it into the baler chute in which chute the baling wires are placed in position, usually by two workmen sitting on opposite sides of the chute on seats such as 4 mounted on the baler carriage.

The amount of compression of the hay in the bales depends largely on the resistance to movement of the hay as it passes through the baling chute. This back pressure may be regulated by more or less restricting the passage of the hay through the chute by means of a spring pressed clamping plate 5 which bears on the adjustable cover 6 of the chute and is pressed toward the bottom 7 of the chute by means of a pair of clamping lever nuts 8 threaded on the upper ends of the draw rods 9 which extend from the lower angle irons 10 past the upper angle irons 11 and through the clamping bar and the coil compression springs 12 on which the clamping nuts 8 bear. This construction per se forms no part of the present invention.

The loader chute itself comprises a broad sheet metal channel shaped to form a horizontally extending portion 12, substantially the length of a large bale of hay, and a rearwardly and upwardly extending portion 13 which elevates the bale into position so as to be readily received on the trailer vehicle 14 which is attached to the trailer hitch 15 on the loader chute. The horizontal portion 12 of the trough or channel is in substantial alignment with the lower portion 7 of the bale ejection chute so that the ejected bale will be completely free of the bale ejection chute before it has to start moving up the incline 13.

The loader chute comprises further a pair of angle iron braces 16 secured at their upper forward ends at 17 to the upper rear end of the bale ejection chute 3 and at their lower rear ends to the loader chute 1 at 18, substantially at the junction of the horizontal part 12 of the chute with the upwardly and rearwardly inclined portion 13 of the chute, and a pair of metal tension bars 19, the front ends of which are secured at 17 to the rear upper end of the bale ejection chute and the rear ends of which are secured at 20 to the side flanges 21 of the upper rear portion of the inclined chute section.

Figure 4:
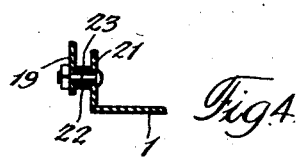
Fig. 4 is a detail sectional view on the line 4—4 of Fig. 3.

As shown in Fig. 4, in order to have ample clearance for the movement of the bales at the sides of the chute, the brace members 16 and 19 may be offset laterally by means of a spacer sleeve 22 through which a securing bolt 23 passes. The chute is provided with a handhole 24 to facilitate the insertion of the coupler pin into the trailer hitch 15 and with openings 25 for drainage. The rear end of the inclined chute section is turned down at 26 for reinforcement and to avoid a sharp edge. The trailer hitch 15 is so positioned on the loader chute that when a trailer vehicle is attached the upper rear end of the loader chute will be about a foot in advance of the front edge 27 of the platform of the trailer vehicle.

In use, the loader chute is attached to the baler chute by means of bolts, and the trailer vehicle 14 is attached to the trailer hitch 15 on the loader chute. The baler is drawn over the field to pick up the hay from the swath or windrow and pack it into the baler chute where it is bound in bales by the workmen or in any suitable manner. These bales are advanced gradually through the baler chute, the rearmost bales being pushed out onto the horizontal part 12 of the loader chute and thence upwardly onto the inclined portion 13 and over the upper end of the inclined portion where they are taken charge of by the attendant and deposited in a suitable position on the platform 28 of the trailer vehicle. In using a rack wagon, as in Fig. 1, the attendant will grasp the bale when it has about reached the position shown of the rearmost bale 29 and will deposit this bale in the vehicle in such a manner as to build up the desired load of bales.

Figure 2:
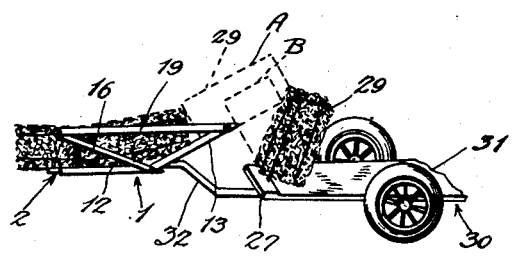
Fig. 2 is a view showing the loader chute delivering the bales to a low platform dump cart.
Figure 3:
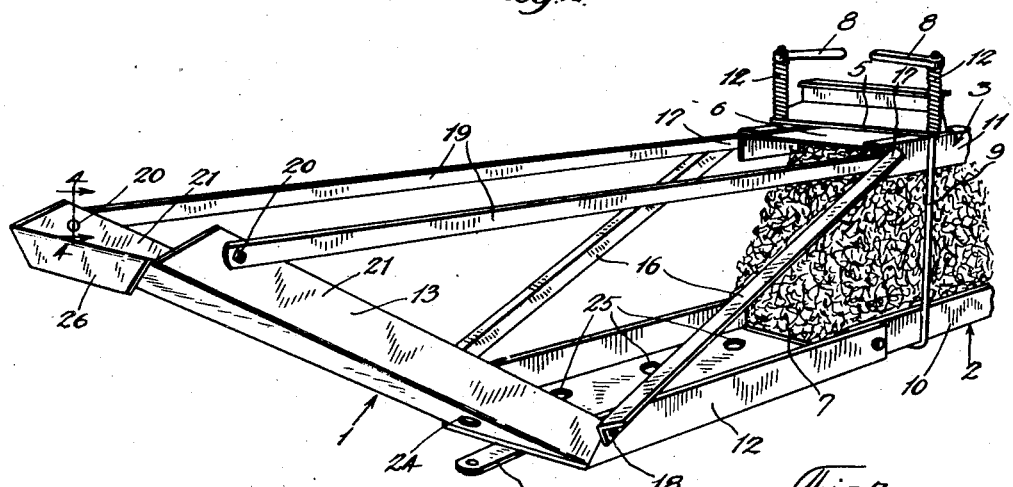
Fig. 3 is an enlarged perspective view showing the loader chute attached to the rear end of the baler.

In the construction shown in Fig. 2, in which a dump cart 30 is used, the attendant on the dump cart platform will allow the bale 29 to be pushed over the upper rear end of the baler chute and to tip down from the position shown at A to the position shown at B. The attendant will then grasp the upper end of the bale and move it to its proper position on the platform 31 of the dump cart.

This bale loader chute makes it possible for the owner of a pickup baler to use rack wagons or dump carts, which he may already own, for transportation of the bales direct from the pickup baler to the storage place. It is no longer necessary to pick up from the ground bales which have been scattered around the field as they are delivered from the pickup baler.

The only possible adjustment that may be required of the standard farm wagon is the length of the stub pole or tongue 32 to get the proper distance between the end of the loader chute and the front edge of the wagon platform. If this distance is about one foot, it permits free movement of the baler and trailer wagon on uneven ground or when turning. The size of the baler chute is made such that it will handle the largest bale that can be made with a nine and one-half foot bale tie. The maximum length of this bale is such that the bale will be clear of the bale ejection chute before it starts up the inclined portion of the loader chute. The low center of gravity of the baler and its substantial weight when filled with bales and its wide tread reduces any tendency of the baler to skid when making short turns. The loader chute is designed to provide a smooth surface for the movement of the bales, both at the bottom and the sides. As previously indicated in the pickup baler, the desired degree of compression of the bales is obtained by regulating the resistance to the passage of bales through the baling chamber by adjusting the lever nuts. When the loader chute is in position, a part of the resistance needed to properly compress the bales for tying is supplied by the resistance to movement of the bales in the loader chute. The operation of the loader chute, therefore, does not require any more power than would be required without it, as when the chute is attached the lever nuts may be loosened up somewhat to compensate for the additional back pressure supplied by the loader chute.

Further modifications will be apparent to those skilled in the art and it is desired, therefore, that the invention be limited only by the scope of the appended claims.

Having thus described my invention, what I claim and desire to secure by Letters Patent is:

1. In a pickup baler having a bale ejection chute extending longitudinally of the direction of travel, a loader chute in registration with the bale ejection chute to which the bales are delivered from the bale ejection chute, said loader chute extending rearwardly and upwardly from the bale ejection chute, and means secured to the loader chute whereby a load vehicle can be connected to be drawn behind the loader chute to receive the bales delivered from said loader chute, said loader chute being unconfining with respect to the upper surface of the bale and having a horizontal portion substantially as long as the bale for receiving the bale from the bale ejection chute and having a rearwardly and upwardly extending portion leading from said horizontal portion for delivering the bale to the load vehicle and being provided with a pair of braces connecting the upper rear end of the inclined portion with the upper rear end of the bale ejection chute and with a pair of braces connecting an intermediate part of the loader chute with the upper rear end of the bale ejection chute, said braces together with the loader chute forming a rigid truss construction comprising two pairs of braces, the front ends of the braces of both pairs being connected to the upper rear end of the bale ejection chute, the rear ends of the upper pair being connected to the rear end of the inclined portion of the loader chute and the rear ends of the other pair being connected to an intermediate part of the loader chute.

2. In a pickup baler, having a bale ejection chute extending longitudinally of the direction of travel, a loader chute in registration with the bale ejection chute to which the bales are delivered from the bale ejection chute, said loader chute having a substantially horizontal portion in registration with said bale ejection chute and also a rearwardly and upwardly extending portion leading from said horizontal portion for delivering the bale to a load vehicle, a trailer hitch carried by the loader chute in the region of the junction of said horizontal and said rearwardly and upwardly extending portion and including a coupling element for connecting with said load vehicle, and said upwardly and rearwardly extending portion providing an opening adjacent said trailer hitch for placing said coupling element in coupling relation between said trailer hitch and said load vehicle.

3. In a pickup baler, having a bale ejection chute extending longitudinally of the direction of travel, a loader chute in registration with the bale ejection chute to which the bales are delivered from the bale ejection chute, said loader chute having a substantially horizontal portion in registration with said bale ejection chute and also a rearwardly and upwardly extending portion leading from said horizontal portion for delivering the bale to a load vehicle, said ejection chute being provided with a pair of braces connecting the upper rear end of the rearwardly and upwardly extending portion with the upper rear end of the bale ejection chute and said loader chute also being provided with a pair of braces connecting an intermediate part of the loader chute with the upper rear end of the bale ejection chute, and certain of said braces being provided with spacing means for locating said braces in spaced relation to a bale ejected from said ejection chute.

STANLEY D. RUSSELL.

REFERENCES CITED

The following references are of record in the file of this patent:

UNITED STATES PATENTS

| Number | Name | Date |
|---|---|---|
| 1,468,849 | West | Sept. 25, 1923 |
| 1,863,648 | Bernard | June 21, 1932 |
| 2,366,426 | Robinson, Jr. | Jan. 2, 1945 |

FOREIGN PATENTS

| Number | Country | Date |
|---|---|---|
| 19,367 | Australia | June 18, 1935 |